United States Patent
Viks et al.

(10) Patent No.: US 7,356,052 B2
(45) Date of Patent: Apr. 8, 2008

(54) OVERHEAD HANDLING METHOD AND SYSTEM FOR HIGH ORDER DATA STREAMS

(75) Inventors: Amihai Viks, Ramat Gan (IL); Jacob Ruthstein, Petach Tikva (IL); Rafael Leiman, Nes Ziona (IL)

(73) Assignee: ECI Telecom Ltd., Petach Tikva (IL)

( * ) Notice: Subject to any disclaimer, the term of this patent is extended or adjusted under 35 U.S.C. 154(b) by 798 days.

(21) Appl. No.: 10/482,038

(22) PCT Filed: Jun. 20, 2002

(86) PCT No.: PCT/IL02/00488
§ 371 (c)(1),
(2), (4) Date: Dec. 29, 2003

(87) PCT Pub. No.: WO03/003629
PCT Pub. Date: Jan. 9, 2003

(65) Prior Publication Data
US 2004/0174870 A1    Sep. 9, 2004

(30) Foreign Application Priority Data
Jun. 28, 2001   (IL) ..................................... 144059

(51) Int. Cl.
H04J 15/00 (2006.01)
H04J 3/04 (2006.01)
H04L 12/28 (2006.01)

(52) U.S. Cl. ................. 370/532; 370/536; 370/907
(58) Field of Classification Search ............... 370/358, 370/357, 539, 476, 541, 535, 537, 907
See application file for complete search history.

(56) References Cited

U.S. PATENT DOCUMENTS

| 5,465,252 | A | 11/1995 | Muller |
| 5,600,648 | A | 2/1997 | Furuta |
| 6,580,731 | B1 * | 6/2003 | Denton ........................ 370/539 |
| 6,594,047 | B1 * | 7/2003 | Ballintine et al. ............ 398/79 |

FOREIGN PATENT DOCUMENTS

EP    0 559 090    9/1993

OTHER PUBLICATIONS

Foundations of Computer Technology by A. John Anderson, CRC Press, 1994, pp. 352-354.*
Foundations of Computer Technology by A. John Anderson, CRC Press, 1994, p. 74.*

* cited by examiner

Primary Examiner—Chau Nguyen
Assistant Examiner—Henry Baron
(74) Attorney, Agent, or Firm—Browdy and Neimark, PLLC

(57) ABSTRACT

A method for fast and economic handling of overhead bytes of an incoming high order data stream to form a corresponding outgoing high order data stream, the method comprising a) presenting the incoming high order data stream as a plurality of N component data streams transmitted in parallel, b) providing a common overhead processing unit (COHPU) capable of handling overhead bytes of a single one of the component data streams, c) forwarding overhead bytes of the component data streams to the COHPU in a circular order, while keeping docketing (ID) information for each particular overhead byte; d) processing each of the overhead bytes in the COHPU, and e) modifying the N component data streams to obtain an outgoing high order data stream based on results of the processing and the ID information with respect to each of the processed overhead bytes.

18 Claims, 2 Drawing Sheets

US 7,356,052 B2

OVERHEAD HANDLING METHOD AND SYSTEM FOR HIGH ORDER DATA STREAMS

FIELD OF THE INVENTION

The invention relates to a method and a system for handling overhead bytes in telecommunication networks operating according to SDH, SONET or OTN data transmission hierarchies.

BACKGROUND OF THE INVENTION

International standards which determine the purposes and ways of treatment of overhead bytes in the above-mentioned hierarchies do not go into details how the treatment should be performed in practice. Though, the requirements which are imposed by the standards to the monitoring of data streams (and connected with handling overhead information) cannot be satisfied without specific technologic developments, especially with respect to high order data streams having high bit rates. The relevant ITU-T Standard Recommendations G.707 (03/96) and G.783 (04/97) concerning SDH transmission hierarchy state how specific overhead bytes must be processed (for example, the handling of the first overhead byte J1 in the SDH standard frame: S. 9.3.1.1.in G.707 and 2.2.2.4 in G.783), but no solutions are proposed for implementing the procedure in any particular SDH data stream.

U.S. Pat. Nos. 5,465,252, and 5,600,648 concern handling SDH-SONET overheads and even specific bytes of such overheads, but do not describe rapid and economic ways of handling overheads of high order data streams.

OBJECT OF THE INVENTION

It is therefore the object of the present invention to provide a fast acting and hardware economic system for handling overhead bytes of high order SDH, SONET and OTN data streams.

SUMMARY OF THE INVENTION

The above object can be achieved by providing a method and a system for fast and economic handling of overhead bytes of an incoming high order data stream, to form a corresponding outgoing high order data stream. The method is usually performed at a network element (NE) of a telecommunication network utilizing high order data streams.

Since the number of overhead bytes forms a smaller part of the total number of bytes in various SDH, SONET and OTN data streams and since the information payload bytes do not require the overhead handling, all the overhead bytes can be processed within the time of passing the payload bytes so, that the OH treatment of the data stream will be accomplished almost on-line.

This estimate has been used by the Inventors in the proposed method and system. It is understood that each component data stream of the high order data stream should be processed from the point of its overhead. It is also understood that the hardware required for processing overhead bytes of each component data stream is quite complex. On the other hand, the hardware units to be used for OH processing of different component data streams are actually identical. However, to the best of the Applicant's knowledge, such hardware units have never been used for handling more than one component data stream of high bit rate data streams. It should be noted that the maximal bit rate technologically possible today for electronic schemes is 311 MHz of STM-16, and that's why STM-16 is usually selected as a component data stream of the STM-256 (16×STM-16=STM-256). In the best mode known today, overhead of the high order data stream STM-256 is handled by processing, in parallel, overheads of the sixteen component STM-16 streams by sixteen identical overhead machines. Such an approach, of course, requires a great amount of hardware.

In general, the proposed method comprises a) presenting an incoming high order data stream as a plurality of component data streams transmitted in parallel, b) providing a common overhead processing unit (COHPU) capable of handling overhead bytes of a single one of said component data streams, c) forwarding to said COHPU overhead bytes of said component data streams in turn, while keeping docketing (ID) information for each particular overhead byte;

d) processing each of the overhead bytes in the COHPU, and e) modifying the component data streams to obtain an outgoing high order data stream based on results of the processing and the ID information with respect to each of the processed overhead bytes.

The order of forwarding OH bytes to the COHPU is preferably cyclical with respect to the number of a particular component data stream in said plurality and successive with respect to the location of a particular overhead byte in a currently selected component data stream. An opposite order may also be used, but it would require more hardware (buffer memory).

In order to implement the OH handling of high order data streams in the fast-acting and hardware-economic way, the bit rate of the component data streams and the bit rate of the COHPU operations should be selected as the maximal technologically possible bit rate, while the bit rate of transmitting data to and from the COHPU—to be lower while enabling processing all the overhead bytes during the particular high order data stream. A version where the bit rate of the component data streams is lower than the maximal technologically possible can be used (say, the bit rate of STM-4), but it will require more hardware than the above-mentioned preferred one.

In the preferred exemplary embodiment, for the SDH and SONET data streams such as STM-64 or STM-256 the bit rate of the component data stream is equal to the bit rate of the COHPU operation (311 MHz of the STM-16) and approximately four times greater than the bit rate of transmitting data to and from the COHPU. Actually, this exemplary ratio (¼) stems from the fact that in SDH/SONET systems utilizing the bit rate of 311 MHz, bytes cannot be transmitted via interface (I/F) means at the maximal speed of 311 MHz, since the bytes' data would affect each other due to delays introduced by wires of the I/F circuitry. By reducing the speed of internal transmitting to be ¼ of the maximal, we still manage handling all the OH bytes in the data stream and even some additional optional bytes. In OTN, the between the two bit rates main utilized in the system can be different. The selected degree of reduction the maximally allowed bit rate for the IF bus should enable handling of standard overhead bytes and optionally, of a number of additional overhead bytes.

The high order data stream under treatment should be understood as a SONET, SDH or OTN frame transmitted with the predetermined high frequency and comprising a predefined area of overhead bytes. (The area consists of overhead portions of the component data streams which in turn is comprised of overhead portions of so-called basic data streams. However, in the frame of the present application the overhead area (portion) may comprise not only the standard overhead bytes, but also those positioned in the overhead zone or in the payload but defined by a customer to bear additional overhead information—so-called programmed OH bytes). For example, the high order data stream can be an STM-256 data stream transmitted as 16 parallel STM-16 component data streams, which are formed by 768 basic data streams STS-1*: (256×3 STS-1's, or 16×48 STS-1's where the STS-1 is the basic data stream. *The STS-1 basic stream is used in SONET networks, for SDH networks it is VC-3. Overhead area of each basic data stream comprises 9 fixed OH bytes and 2 programmable OH bytes).

In the OTN data streams (such as ODU-1, ODU-2, ODU-3), the component data stream is formed by a single basic data stream (i.e., is equal to the basic data stream), so that only one entity overhead is to be passed through a particular sample buffer assigned to a particular component data stream.

In view of the above, the steps of the method can be performed as follows:

a) defining a basic data stream of the component data stream wherein the basic data stream with its payload portion and its overhead portion is a building block of the component data stream, and the high order incoming data stream is formed from N said component data streams, b) The COHPU capable of processing overhead of the component data stream may actually constitute a unit capable of processing the overhead of the basic data stream; in addition to the COHPU, providing a set of N sample buffers SB and a set of N insert buffers IB.

c) at the bit rate of the component data stream, gradually extracting overhead portions of the basic data streams forming each of said component data streams, and respectively storing said overhead portions in N sample buffers assigned to the respective component data streams, while forming ID information of the byte by docketing each stored overhead byte, a particular basic data stream and a particular component data stream to which it belongs; transmitting the OH bytes to the COHPU;

d) processing each of said overhead bytes in the COHPU at the bit rate of said component data stream, and obtaining results of the processing of each particular byte in the form of at least one instruction selected from a list comprising alarms, operations with the particular overhead byte in the outgoing high order data stream and operations with other bytes in the outgoing high order data stream;

e) based on results of the processing, transmitting from the COHPU said at least one instruction with respect to each of said overhead bytes, wherein the transmitting being provided to N insert buffers respectively assigned to the N component data streams so that, said instructions arrive in turn to the respective insert buffers according to said ID information; and executing said instructions at said N respective insert buffers, for the respective component data streams of the incoming high order data stream, thereby obtaining N component data streams of the outgoing high order data stream.

By providing the above operations with such a ratio of speeds, the overhead handling can be successfully performed while the incoming data stream passes a system handling the overhead. Since the amount of payload bytes in a frame-type data stream is usually greater than the amount of overhead bytes in the same data stream, the proposed method enables handling all the overhead bytes of the high order data streams almost on-line. The system may be part of a network element. It should be noted that the method (and the system) enable effective hardware utilizing owing to uniformly processing the overhead bytes of component data streams forming the high order data stream by the common overhead processing unit.

More particularly and preferably, the steps of the proposed method can be accomplished by the following operations.

The step of representing (a) can preferably be performed as composing the incoming high order data stream, preferably STM-256 as 16 component data streams STM-16 transmitted in parallel, where each of the component data streams can be divided into 48 basic data streams (entities) STS-1 for SONET hierarchy (or 48 VC-3 for SDH hierarchy). For OTN systems, the high order data stream can be presented by sixteen component streams of ODU1, four component streams of ODU2 and a single ODU3.

The step (c) comprising gradually extracting and storing the OH portions in the N sample buffers is performed per byte, while the capacity of the sample buffers is quite small (can be for one byte only), just for preparing the OH bytes belonging to the N respective component streams, for further accessing and processing.

The operations of gradually extracting and storing are accompanied with a step of creating the ID information by docketing each of the stored OH bytes for its further identification in the handling process, the docketing comprising indication of location and type of each OH byte in the high order data stream by assigning to each particular OH byte numbers of: the component data stream (sample buffer), the basic data stream (entity) to which the byte belongs and the number (position) of the byte in the basic data stream. The obtained docketing (ID) information is preserved during the whole process of the OH handling of the incoming high order data stream.

The operation of transmitting the overhead portions from the N sample buffers to the common OH processing unit is performed by successively accessing the N sample buffers in a cyclical order and extracting therefrom every one of the overhead bytes for further handling, while preserving the docketing information.

The step (d) of processing the OH bytes in the common OH processing unit comprises successively forwarding each particular OH byte extracted from the N sample memory blocks to an operator block corresponding to the type of said particular overhead byte and the kind of processing required for the byte, said operator blocks forming part of said common processing unit. It should be noted that not only the ID (docketing) information determines to which operator block a particular OH byte is to be sent. A number of different OH bytes can be handled by one operator block, if the kind of processing required for these bytes is the same. The step of processing includes handling the forwarded overhead bytes in the respective operator blocks at the bit rate of the component data stream.

In the above method, the results of the OH processing are obtained in the form of at least one instruction. More particularly, said at least one instruction is to be executed in a particular basic data stream and can be selected from the following non-exhaustive list comprising: alarms analyzed at various levels of the OH handling system, an instruction to pass a particular overhead (OH) byte as is, an instruction to change a particular OH byte, an instruction to insert a particular value in a particular OH byte, an instruction to change the place of a particular OH byte in the basic data stream, an instruction to insert all "1", all "0" or other pattern in the whole frame of the basic data stream, etc.

The step of transmitting said at least one instruction from the common OH processing unit comprises correlating alarms and accumulating instructions and data to be applied to a particular OH byte and forwarding same to said N insert buffers being capable of inserting OH and other bytes to respective N component data streams.

The step of executing said instructions at the N insert buffers comprises inserting such bytes into the respective component data streams of the outgoing high order data stream, which enable fulfilling said instructions; the inserting being performed using the docketing (1D) information.

According to a second aspect of the invention, there is provided a system for implementing the above method of handling overhead bytes of an incoming high order data stream formed as N parallel component data streams (each built from M basic data streams), to obtain an outgoing high order data stream.

The system comprises:

a set of N sample buffers, for gradually extracting and storing overhead bytes of the respective N component data streams of the incoming high order data stream, and keeping ID information on the bytes stored in each of the sample buffers;

a common overhead processing unit (COHPU) for successively processing the overhead bytes obtained from said N sample buffers while creating and keeping complete ID information on said bytes so as to produce instructions for modifying respective component data streams of the outgoing high order data stream;

a set of N insert buffers, for gradually modifying the respective N component data streams of the outgoing high order data stream upon receiving suitable said instructions per each processed overhead byte accompanied with its ID information, a bus interface capable of transmitting the overhead bytes from the sample buffers to the common overhead processing unit (COHPU) and capable of transmitting instructions from said COHPU to the insert buffers.

The sample buffers are respectively provided with internal microprocessors to control extraction of the overhead bytes from the incoming high order data stream, storing thereof in the sample buffers and docketing thereof to identify the type and location of the byte in the sample buffer for further processing. The capacity of the sample buffers is quite small (can be for one byte only), just for preparing the OH bytes belonging to the N respective component streams, for further accessing and processing (it means that the extracting, storing the OH portions in the N sample buffers will be performed per byte).

More particularly, and according to the preferred embodiment, the common processing unit COHPU is capable of processing overhead-bytes of a basic data stream being a building block of any of said component data streams; the COHPU is responsible of coordinating the cyclic (cyclic-successive) transmission of said overhead bytes from the sample buffers via said bus interface, distributing the received overhead bytes for separate handling thereof, and also responsible of coordinating and transmitting instructions from the COHPU via said bus interface to said insert buffers.

As has been mentioned above, the instructions comprise various alarms and orders for handling the overhead or other bytes of the outgoing data stream. Both are obtained by processing the obtained overhead bytes using rules stored in the COHPU in a so-called Rules RAM. The common processing unit COHPU is therefore responsible of forming the instructions to the insert buffers by coordinating alarms in combination with orders with respect to particular bytes.

The COHPU is preferably programmed so that the order of receiving the OH bytes from said sample buffers be cyclical with respect to the sample buffers while successive with respect to the overhead bytes in a selected sample buffer. The order of transmitting the instructions from the COHPU to the insert buffers is the same, though may be performed with a particular delay. Since the docketing (ID) information is forwarded to the common processing unit COHPU from the sample buffers, the COHPU is provided with means (for example, hardware) for fulfilling the received ID information to form the complete ID information on the received overhead (OH) bytes, for further controlling and synchronizing the processing.

The bus interface is capable of performing all the transmissions with the suitable ID information. In case the COHPU operates at the maximal technologically acceptable bit rate, the bus interface operates at a reduced bit rate still enabling processing OH bytes of the high order data stream by the common OH processing unit (COHPU). For example, if the COHPU operates at a bit rate of 311 MHz which is presently the maximal technological limit, the interface bus should operate at any lower bit rate which still allows the complete processing of OH bytes of the high order data stream by means of the commonly used COHPU.

The insert buffers are provided with respective internal microprocessors responsible for executing the instruction received from the COHPU in the insert buffers, for example—of inserting suitable contents in overhead or other bytes of the outgoing high order data stream according to said instructions. For executing instructions with respect to non-overhead bytes, the insert buffers are preferably associated with by respective additional buffer memory blocks.

The above-described system partially uses principles of the parallel processing and, due to that, is fast acting. Owing to the existence of a common OHPU block, the described system enables processing all the overhead bytes and even additional overhead bytes of a high order data stream online and with the minimal hardware. The additional overhead bytes should be understood as those which, according to the existing standards, are not to be obligatory processed, but would provide additional functionality if loaded by an auxiliary information and processed. These additional bytes for transmitting additional information and processing may be selected from areas which are not considered the overhead area by standards.

More aspects and details of the invention will be apparent from the drawings and the detailed description which follow.

BRIEF DESCRIPTION OF THE DRAWINGS

The invention will further be described with the aid of the following non-limiting drawings in which.

DETAILED DESCRIPTION OF THE PREFERRED EMBODIMENTS

Figure 1:
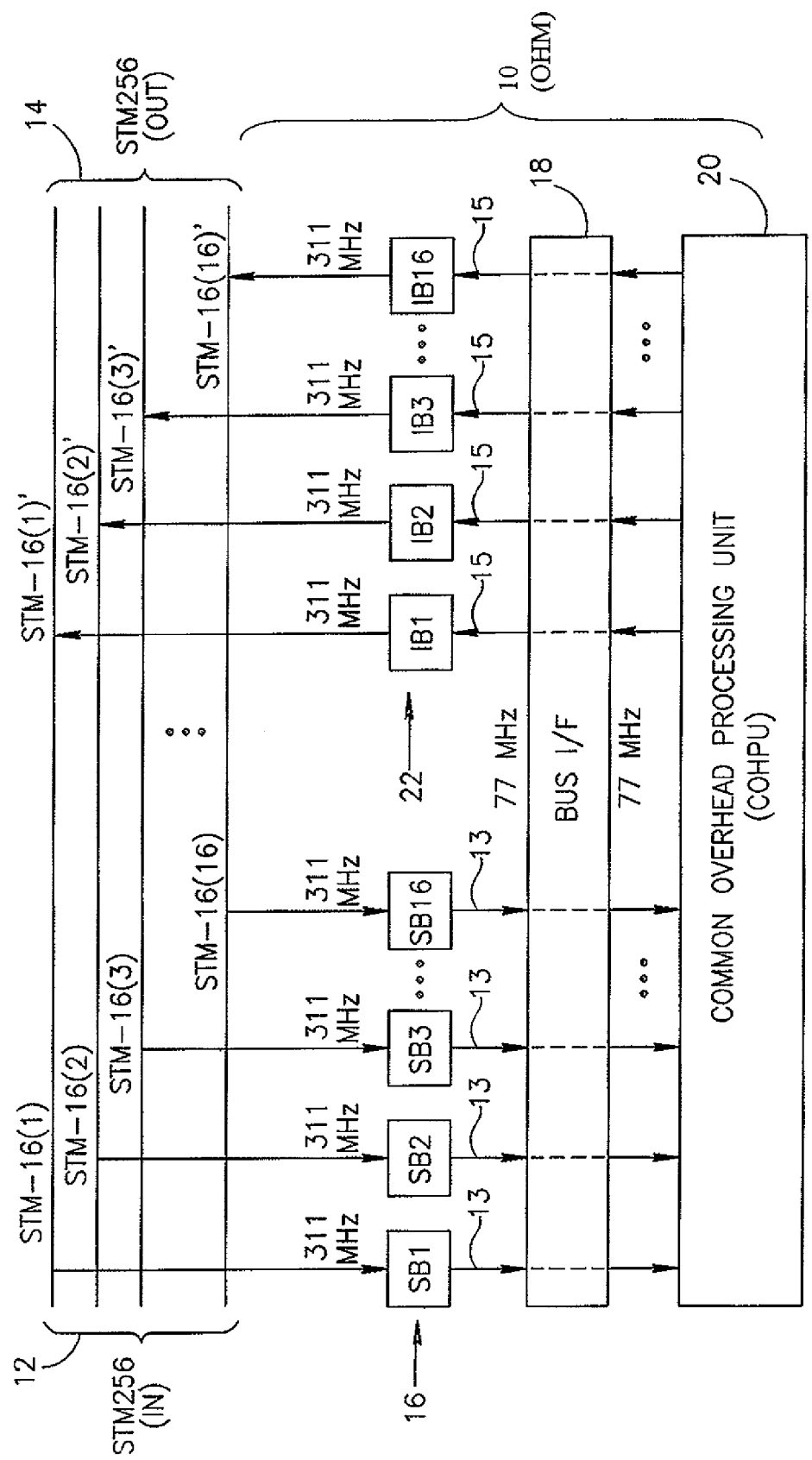
FIG. 1 is a schematic block diagram of the system for handling overhead of high order data streams according to the invention.

FIG. 1 shows a generalized block-diagram of the Overhead Machine (OHM) 10 which, according to this particular embodiment, is designed for handling the high order data stream STM-256. The incoming STM-256 is schematically marked with 12 and represented by sixteen (N=16) component data streams STM-16 transmitted in parallel. The incoming component data streams are indicated as STM-16 (1), STM-16(2), . . . STM-16(16). The purpose of the system is to process overhead bytes of all the component data streams and, based on results of the processing, to form an outgoing high order data stream STM-256' marked 14. Each of the incoming component data streams is scanned to forward ("extract") its overhead bytes to a corresponding Sample Buffer from a set of such buffers (generally marked 16). As a result, all the sixteen component data streams respectively and gradually (per byte) feed the Sample Buffers SB1, SB2, . . . SB16 with overhead portions thereof. In practice, each of the sample buffers obtain and store (byte after byte) overhead portions of the basic data streams which form the corresponding component data stream associated with the particular Sample Buffer. In this particular example, overhead portions of 48 basic data streams STS-1 pass through each of the Sample Buffers. The Sample Buffers may have a very small capacity (even of one byte only) and are intended to keep the overhead bytes for a limited time—up to a moment when a particular byte is taken for processing. The Sample Buffers are provided with respective microprocessors (not shown) which, for example, control extraction of the overhead bytes from the component data streams STM-16(1) . . . STM-16(16) and keep the docketing in the buffers.

It is understood that each component data stream of the high order data stream should be processed from the point of its overhead. It is also understood that the hardware required for processing overhead bytes of each component data stream is quite complex. On the other hand, the hardware units to be used for OH processing of different component data streams (moreover, even of different basic data streams) are actually identical. However, to the best of the Applicant's knowledge, such hardware units have never been used for handling more than one component data stream of high bit rate data streams (for example, STM-256). The reason for that was a consideration of loosing the fast acting feature, which now appears to be non-justified.

In the embodiment illustrated in FIG. 1, the overhead bytes are stored in the sample buffers SB1 . . . SB 16 at the bit rate of the component data stream STM-16, i.e., at 311 MHz. These bytes are then transmitted, byte by byte, to a Common OH Processing Unit COHPU 20 (via an interface bus 18) at the bit rate of 77 MHz, i.e., four times lower than the bit rate of STM-16. The bytes are taken from the sample buffers SB1. SB16 in a cyclical order, so that all the component data streams feeding the sample buffers are handled substantially in parallel. In a sample buffer currently accessed to, the first available OH byte is selected, so that the order within the sample buffer is successive. Such an arrangement enables minimizing the hardware of the sample buffers. Each of the OH bytes is transmitted with its ID (docketing) information (arrows 15) comprising indication of the type of the overhead byte (i.e. its number in a basic data stream) and its location (i.e., the number of the basic data stream in the component one). The ID completion can be performed in the COHPU 20 by fulfilling the docketing data by the number of the component data stream to which the byte belongs. The COHPU 20 operates at the high speed of 311 MHz. Results of the processing in the unit 20 are outputted therefrom via the interface bus 18 at the lower speed of 77 MHz. The speed, selected for interaction of the interface bus 18 with the sample buffers 16 on the one hand and the COHPU 20 on the other hand, enables obtaining the correct time balance between the process of feeding the overhead handling unit 20 with data, the process of handling the data in the unit 20 and also the process of issuing results of the processing from the unit 20 via the interface bus 18.

The COHPU unit 20 ensures processing of each received overhead byte, while keeping and tracing its ID information.

The results of the overhead processing obtained in the unit 20 are issued in the form of instructions obtained upon handling each of the overhead bytes. According to the ID information which is kept in the unit 20 for each of the OH bytes, the instructions are forwarded (arrows 15) via the interface bus 18 to respective Insert Buffers IB1, IB2, . . . IB16 of a set 22. Each of the Insert Buffers is intended for executing the instructions obtained from the unit 20 with respect to overhead and other bytes of a particular component data stream assigned to this Insert Buffer. The Insert Buffers store only the OH bytes to be inserted in the data stream. The capacity of these buffers is the same as of the Sample buffers. However, if according to a particular instruction any pattern is to be introduced in non-OH bytes of the stream, additional means are organized to insert information into other passing bytes of the outgoing stream. Namely, for operations with non-OH bytes of the streams, the Insert Buffers can be provided with respective additional buffers (not shown). The ID information received with the instructions enables the suitable insert buffer (say, IB1) to detect the correct bytes from the corresponding component data stream (STM-16(1')) and perform with them the required operations, i.e. to insert into the stream the required information. Similar operations take place with respect to the associated additional buffers, if suitable instructions are received. Upon executing the instructions (to be performed at the bit rate of 311 MHz), the relevant bytes are inserted into the corresponding component data stream (say, STM-16(1') of the outgoing high order data stream 14 (STM-256').

Figure 2:
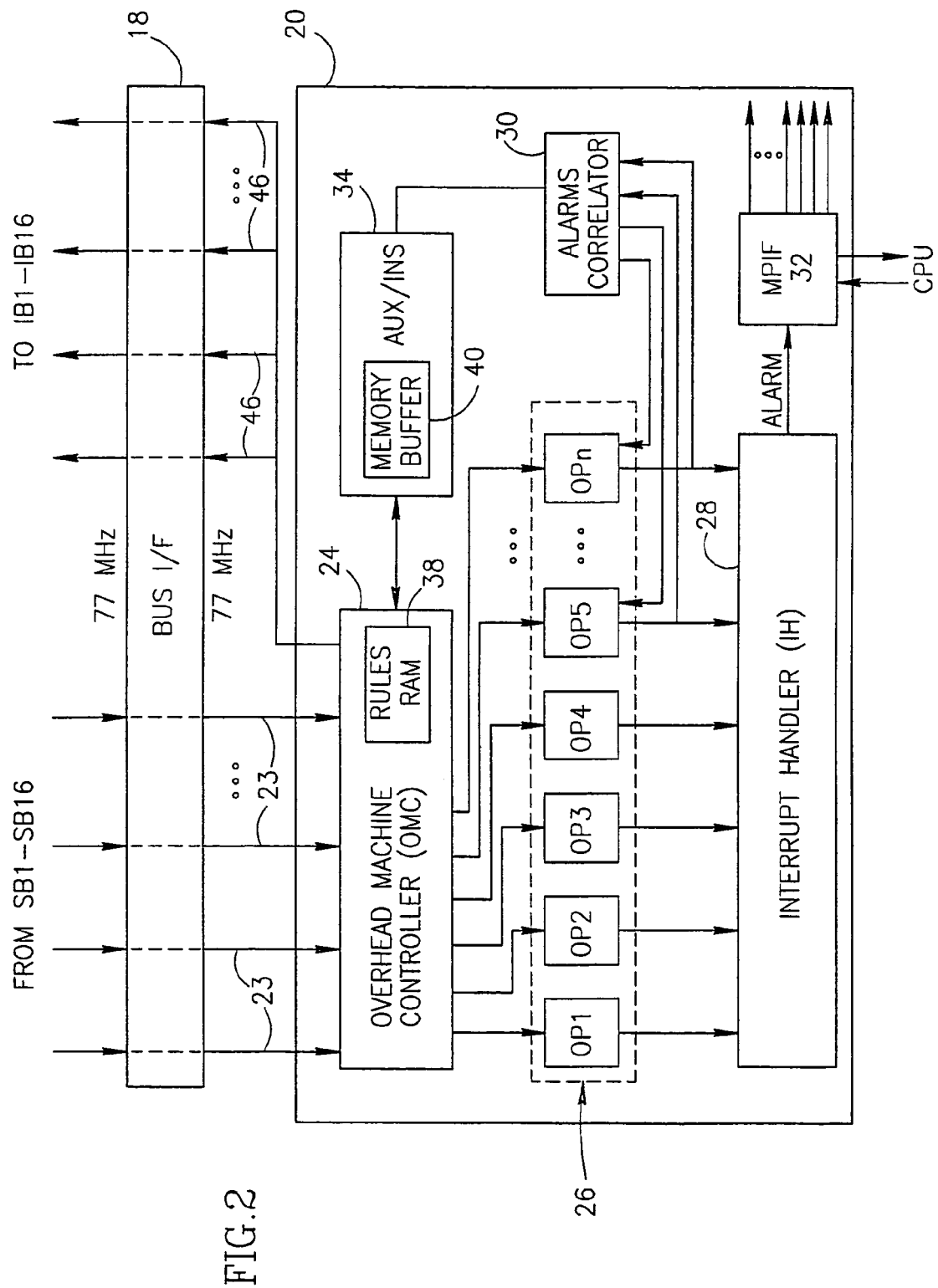
FIG. 2 is a block diagram of one embodiment of the common processing unit shown in FIG. 1.

The nature and the purpose of the instructions issued by the common OH processing unit 20 to the Insert Samples 22 will be specified in FIG. 2 in more detail.

FIG. 2 illustrates, in more detail, a block diagram of the common overhead processing unit (COHPU) 20 to specify its structure and functions. The COHPU comprises an overhead machine controller (OMC) marked 24 with "n" operator blocks OP1, OP2, . . . OPn generally indicated 26, an interrupt handler IH 28, an alarm correlator AC 30, a machine interface block MPIF 32, and an auxiliary/insert block AUX/INS 34.

The OMC block 24 successively receives, from the interface bus 18, overhead bytes each provided with D information indicating to which component data stream (sample buffer), basic data stream(entity) and kind (number of the byte in the entity) it belongs. Information transmitted from the sample buffers via the interface bus 18 is schematically marked by arrows 23. According to a table 38 stored in the OMC and called a Rules RAM, the OMC selects an operator block OP1-OPn to which the currently received byte is to be forwarded for the processing. It should be noted, that one and the same kind of processing (one and the same operator block) can be suitable for more than one overhead bytes of the basic data stream. The operator blocks 26 are responsible of performing any type of handling, required for processing all overhead bytes of the basic data stream selected for the system. In the present example, the basic data stream is the STS-1 stream and the operator blocks OP1-OPn are capable of handling 9 fixed (standardized) overhead bytes and 2 additional (programmed) overhead bytes of this entity. For the incoming data stream STM-256, the COHPU will therefore repeat its processing for each overhead byte in the sixteen component data streams, each comprising 48 basic data streams (entities): (9+2)×48×16.

Upon processing of a specific overhead byte in a suitable operator block, it issues at least one instruction. The instruction may constitute an alarm forwarded to the Interrupt Handler 28 (see arrows from OP1, OP2, OP3), some kinds of alarms are sent to the block of Alarms Correlation 30 (see arrows from OP5, OPn). The alarms may be, for example, AIS—alarm indication signal, EBER—exceeded bit error rate, SD—signal degrade, etc. The Alarms Correlator 30 issues a resulting alarm signal to the AUX/INS unit 34. Alternatively, or in addition, particular operator blocks may issue specific contents of the overhead byte to be inserted in the outgoing stream (see OP4), and such contents are forwarded to the AUX/INS block 34 and temporarily stored therein in a memory buffer 40. This option is actual for cases where a particular overhead byte in the incoming high order data stream should be filled with a different information in the outgoing stream. Due to that, the memory buffer 40 of the block 34 should be sufficient for storing information in such occurrences. The COHPU 20 is connected to an interface block 32 (MPIF—microprocessor interface) which receives alarms from the Interrupt Handler 28 and external commands from the outside Central Processing Unit (CPU), not shown) connected to other overhead Machines in the system. The outside processor is responsible for data collection for a number of outside purposes, and for forwarding to the elements of the OHM 10 (see FIG. 1) general instructions such as configuration orders (for example, whether the OHM conveys the stream without changes (transparently) or should insert the results of the processing). The MPIF 32 is an instrument for configuring any block of the OHM from the CPU. MPIF affects any of the blocks via its corresponding configuration RAM (not shown). Also, it collects all the alarms to send them to CPU.

The OMC 24 and AUX/INS 34 are bilaterally interconnected. The OMC keeps the ID information, while the AUX stores data received from the operators/alarm correlator for specific bytes; in practice, OMC 24 asks the AUX/INS 34 about data concerning a specific ID, receives the requested data (byte contents, and/or orders) from block 34 and sends it to the corresponding insert buffer with the ID information (instruction arrows 46).

In other words, the instructions 46 produced by the COHPU are formed from alarms and orders with respect to overhead bytes.

The instructions 46 issued by the OMC 24 are accompanied by a suitable ID information and may be, for example, of the following nature:
1. The specified overhead byte is to be passed without changes in the outgoing data stream;
2. The specified overhead byte is to be replaced with a prepared data (the data is read from the memory buffer 40 and transmitted to the suitable insert buffer within the instruction);
3. The specified overhead byte is to be corrected (the correction is enclosed within the instruction);
4. All bytes in a particular basic data stream or a particular component data stream is to be filled with all "111", all "000" (cases of general alarms, such as AIS), or another pattern (say, PRBS "pseudo random binary sequence").

While the COHPU 20 operates at the bit rate 311 MHz, the overhead bytes with ID (23) and the instructions with ID (46) are transmitted at the bit rate 77 MHz to the insert buffers (22, FIG. 1) where they are executed.

The order of transmitting data from the COHPU to the Insert Buffers is the same as from the Sample Buffers to COHPU, but may have a delay which does not affect operation of the overhead machine.

For example, OMC requires data with respect to a particular OH byte. If the result for a particular OH byte is ready, it is inserted into a coming relevant byte of the stream. If it is not ready yet, the previous result will be inserted in the current frame of the stream in response to the OMC request. The outside processor unit may order to disregard the overhead processing and transmit the incoming data stream transparently, without any changes. The overhead handling results may then be collected in the outside processor for statistics, billing or other purposes.

The invention claimed is:

1. A method for handling of overhead (OH) bytes of an incoming high order data stream to form a corresponding outgoing data stream, the method comprising
   a) presenting the incoming data stream as a plurality of N lower order component data streams transmitted in parallel,
   b) providing a common overhead processing unit (COHPU) capable of handling overhead bytes of a single one of said component data streams,
   c) forwarding overhead bytes of said component data streams to said COHPU in a circular order, while keeping docketing (ID) information for each particular overhead byte
   d) processing each of the overhead bytes in the COHPU, at a bit rate of said component data stream, and
   e) modifying the N component data streams to obtain the corresponding outgoing data stream based on results of the processing and the ID information with respect to each of the processed overhead bytes;
   wherein the processing step (d) comprises:
      completing and keeping said docketing (ID) information including the number of a component data stream to which each particular OH byte belongs,
      successively forwarding each particular received OH byte to an operator block corresponding to the type of said particular overhead byte and the kind of processing required for the byte, said operator blocks forming part of said common overhead processing unit, and
      obtaining results of the processing of each particular OH byte in the form of at least one instruction selected from a list comprising alarms, operations with the particular overhead byte in the outgoing data stream and operations with other bytes in the outgoing data stream.

2. The method according to claim 1, wherein the order of forwarding OH bytes to the COHPU in step (c) is cyclical with respect to the number of a particular component data stream in said plurality and successive with respect to the location of a particular overhead byte in a currently selected component data stream.

3. The method according to claim 1 or 2, wherein the bit rate of the component data streams and the bit rate of the COHPU operations is selected as the maximal technologically possible bit rate, while the bit rate of transmitting data to and from the COHPU is selected to be lower though enabling timely processing of all the overhead bytes of the incoming data stream.

4. The method according to claim 3, wherein the bit rate of the component data stream is equal to the bit rate of the COHPU operation being of about 311 MHz and is approximately four times greater than the bit rate of transmitting data to and from the COHPU.

5. The method according to claim 1, wherein the incoming data stream is a frames succession of any one of SONET, SDH or OTN transmission hierarchies.

6. The method according to claim 1, wherein the step (a) comprises defining a basic data stream of the component data stream wherein the basic data stream with its payload portion and its overhead portion is a building block of the component data stream.

7. The method according to claim 6, wherein, in the step (b), ensuring that the COHPU is capable of processing the overhead of the basic data stream and thereby capable of processing overhead of the component data stream.

8. The method according to claim 1, further comprising providing a set of N sample buffers SB and a set of N insert buffers IB respectively corresponding to the N component data streams.

9. The method according to claim 8, further comprising performing the following sub-steps before the step (c):
at the bit rate of the component data stream, gradually extracting overhead portions of the basic data streams forming each of said component data streams,
respectively storing said overhead portions in the N sample buffers assigned to the respective component data streams, while
forming said ID information of the OH bytes by docketing each stored overhead byte and a particular basic data stream to which it belongs.

10. The method according to claim 1, wherein the step (e) of modifying the component data streams comprises the following sub-steps:
based on results of the processing, transmitting from the COHPU at least one instruction with respect to each of said overhead bytes, wherein the transmitting being provided to N insert buffers respectively assigned to the N component data streams so that said instructions arrive in turn to the respective insert buffers according to said ID information; and
executing said instructions at said N respective insert buffers, for the respective component data streams of the incoming data stream, thereby obtaining N component data streams of the corresponding outgoing data stream.

11. The method according to claim 1, wherein the step (a) is performed as composing the incoming higher order data stream STM-256 as 16 lower order component data streams STM-16 transmitted in parallel, where each of the component data streams consists either of 48 basic data streams STS-1 for SONET hierarchy or 48 VC-3 for SDH hierarchy.

12. A system for handling overhead bytes of an incoming higher order data stream formed as N parallel lower order component data streams, to obtain an outgoing higher order data stream, the system comprises:
a set of N sample buffers, for gradually extracting and storing overhead bytes of the respective N component data streams of the incoming data stream, and keeping docketing ID information on the bytes stored in each of the sample buffers;
a common overhead processing unit (COHPU) for successively processing the overhead bytes obtained from said N sample buffers while completing and keeping the ID information on said bytes so as to produce instructions for modifying respective component data streams of the outgoing data stream;
a set of N insert buffers, for gradually modifying the respective N component data streams of the outgoing high order data stream upon receiving suitable said instructions per each processed overhead byte accompanied with its ID information;
a bus interface capable of transmitting the overhead bytes from the sample buffers to the common overhead processing unit (COHPU) and capable of transmitting the instructions from said COHPU to the insert buffers, and
wherein said COHPU comprises a set of operator blocks capable of processing the received OH bytes, and a Rules memory block for distributing the OH bytes between said operator blocks.
and wherein, based on the processing in said operator blocks, said COHPU is capable of producing said instructions comprising alarms and/or orders for handling overhead or other bytes of the outgoing data stream.

13. The system according to claim 12, wherein said sample buffers are respectively provided with internal microprocessors to control extraction of the overhead bytes from the incoming data stream, storing thereof in the sample buffers and docketing thereof to identify the type and location of the byte in the sample buffer for further processing.

14. The system according to claim 12 or 13, wherein the common processing unit COHPU is capable of processing overhead bytes of a basic data stream being a building block of any of said component data streams; the COHPU is responsible of arranging cyclic transmission of said overhead bytes from the sample buffers via said bus interface, distributing the received overhead bytes for separate handling thereof, and also responsible of coordinating and transmitting the instructions from the COHPU via said bus interface to said insert buffers.

15. The system according to claim 12, wherein the COHPU is programmed so that the order of receiving the OH bytes from said sample buffers cyclical with respect to the sample buffers while successive with respect to the overhead bytes in a selected sample buffer.

16. The system according to claim 12, wherein the COHPU operates at the maximal technologically acceptable bit rate, the bus interface operates at a reduced bit rate still enabling processing OH bytes of the incoming data stream by the common OH processing unit (COHPU).

17. The system according to claim 12, wherein the insert buffers are provided with respective internal microprocessors responsible for executing the respective instructions received from the COHPU.

18. The system according to claim 12, designed for processing overhead of the incoming data stream STM-256.

* * * * *